United States Patent Office 3,432,467
Patented Mar. 11, 1969

3,432,467
POLYESTERS OF IMPROVED DYEABILITY
CONTAINING TERTIARY AMINES
Trevor Davies, Anthony Julian East, and Michael King
McCreath, Harrogate, England, assignors to Imperial
Chemical Industries Limited, London, England, a corporation of Great Britain
No Drawing. Filed May 17, 1965, Ser. No. 456,554
Claims priority, application Great Britain, May 20, 1964, 20,753/64
U.S. Cl. 260—47                7 Claims
Int. Cl. C08g 39/02; D01n 5/10; D06p 3/34

ABSTRACT OF THE DISCLOSURE

A process for the preparation of polyester or copolyester fibers by forming an intimate mixture in the molten state of a polyester or copolyester containing up to 0.8% by weight of nitrogen in the form of an amine of the formula:

where each of the groups —R, —R' and —R" is one of the following groups: alkyl, aryl, aralkyl, alkaryl and cycloalkyl, and melt-spinning the mixture to form fibers.

---

The present invention relates to the preparation of polyester fibres of improved dyeability towards acid dyestuffs, and of improved stability to aqueous hydrolysis.

According to the present invention we provide a process for the preparation of polyester or copolyester fibres by forming an intimate mixture in the molten state of a polyester or copolyester containing up to 0.8% by weight of nitrogen in the form of an amine of the formula:

where each of the groups —R, —R' and R" is one of the following groups: alkyl, aryl, aralkyl, alkaryl and cycloalkyl, and melt-spinning the mixture to form fibres.

The mixture of the polyester or copolyester with the amine may be prepared by any known method such, for example, as adding the amine to the molten polymer and mixing it to the required extent, or tumbling the particulate polymer with the amine and then melting the mixture. When the primary mixing is effected with the polymer in the solid state, it may be convenient to add the amine in a solvent, the solvent being thereafter evaporated off.

The process of our invention is effective when applied for example to polyesters which may be prepared by the reaction of an aromatic dicarboxylic acid together with a glycol, for example ethylene glycol, and when applied to copolyesters of the type described but wherein a portion of the dicarboxylic acid is replaced by a second dicarboxylic acid or hydroxy carboxylic acid and/or a portion of the glycol is replaced by a second glycol.

Examples of suitable dicarboxylic acids on which the polyesters of our invention may be based are terephthalic acid and 1:2-diphenoxyethane-4:4'-dicarboxylic acid. Examples of suitable second dicarboxylic acids are isophthalic acid and sebacic acid.

We have found that the polyesters or copolyesters made according to the process of our invention have greatly improved substantivity towards acid dyestuffs, such substantivity being resistant to scouring at temperatures of the order of 100° C. The shades produced by dyeing the fibres produced by the process of our invention are fast to washing. The polyesters or copolyesters made according to the process of our invention also have improved stability to aqueous hydrolysis, this being particularly important at elevated temperatures.

The incorporation in the polyester of amine corresponding to greater than 0.8% of nitrogen leads to difficulty in maintaining the threadline. A useful level of nitrogen content is 0.2 to 0.5%.

In order that the process of our invention should be the more fully comprehended, we give hereinafter examples of methods in which our invention may be put into practice.

Example 1

Polyethylene terephthalate was prepared according to the usual method for the preparation of high molecular weight polyesters by the reaction of dimethyl terephthalate with ethylene glycol using calcium acetate as the ester-interchange catalyst and antimony trioxide as the polycondensation catalyst; the ester-interchange catalyst was inactivated by phosphorous acid before carrying out the polycondensation stage. The resultant polyethylene terephthalate had intrinsic viscosity 0.764 as measured in orthochlorophenol at 1% concentration by weight at 25° C. The polyethylene terephthalate was powered and thoroughly mixed by means of a ball mill with an amount of tribenzylamine to give a final mixture containing 5 percent by weight of tribenzylamine. The resultant mixture was melt-spun at 265° C. at a throughput of 2.0 grams per minute using a wind up speed of 1000 feet per minute. The resultant fibres were cold-drawn using a draw ratio of 3:1 over a pin at 75° C. and a plate at 130° C.

The drawn fibre was dyed by boiling a portion in 0.1 percent by weight aqueous solution of dyestuff for 1 hour in the presence of 1 percent by weight of acetic acid and 0.5 percent by weight of orthophenylphenol. Separate samples of the fibre were dyed with each of the following dyestuffs.

| Dyestuff: | Colour index |
|---|---|
| Nylomine Red | Acid Blue 266. |
| Solway Blue 2GS | Acid Blue 40. |
| Solacet Fast Red 5BGS | Acid Red 156. |
| Naphthalene Red JS | Acid Red 88. |

In each case the fibre was dyed to a deep shade.

Example 2

Polyethylene terephthalate was prepared according to the usual method for the preparation of high molecular weight polyesters by the reaction of dimethyl terephthalate with ethylene glycol using zinc acetate as catalyst for both the ester interchange and polycondensation stages. At the end of the polycondensation reaction the zinc acetate catalyst was inactivated by addition of phosphorous acid. The polyethylene terephthalate was delustred by the addition during the reaction of titanium dioxide to give a final product containing 0.5 percent by weight of titanium dioxide. The resultant polyethylene terephthalate had intrinsic viscosity 0.583 as measured in 1 percent by weight solution in orthochlorophenol at 25° C. The polyethylene terephthalate was powdered and thoroughly mixed by means of a ball mill with an amount of NN-dicyclohexylbenzylamine to give a final mixture containing 10 percent by weight of NN-dicyclohexylbenzylamine. The resultant mixture was melt spun at 270° C. The resultant filaments were drawn over a hot plate at 120° C. using a draw ratio of 5.5:1 to give colourless fibre. The fibre was dyed exactly as described in Example 1 using Nylomine Red as the dyestuff. The fibre was dyed to a deep shade.

Example 3

Polyethylene terephthalate prepared as in Example 2, of intrinsic viscosity 0.568 as measured at 1% by weight concentration in orthochlorophenol at 25° C., was diced to a dice size of ⅛ inch cube. This material was tumbled for 16 hours with an amount of tri(n-octyl) amine to give a final mixture containing 2% by weight of tri(n-octyl) amine. The resultant mixture was melt spun at 285° C. The resultant filaments were drawn over a hot pin at 95° C. and a hot plate at 195° C. using a draw ratio of 5½:1 to give colourless fibre, of intrinsic viscosity 0.49. Polyethylene terephthalate prepared in exactly the same way but without addition of tri(n-octyl) amine was melt spun under identical conditions, and the resultant filaments were drawn under identical conditions to give colourless fibre of intrinsic viscosity 0.52. The two types of fibre were suspended in water in sealed glass tubes and were then heated for 4 hours at 175° C. The intrinsic viscosity of the treated fibre was then found to be 0.47, whereas that of the untreated control fibre was 0.38.

Thus the presence of the tri(n-octyl) amine resulted in an improvement of hydrolytic stability of the polyethylene terephthalate.

Example 4

Poly(ethylene 1:2 - diphenoxyethane - 4:4′ dicarboxylate), of intrinsic viscosity 0.584 as measured at 1% by weight concentration in orthochlorophenol was finely powdered and dry-milled with an amount of recrystallised tribenzylamine such that the final mixture contained 10% by weight of tribenzylamine. The resultant mixture was melt-spun at 253° C., using a windup speed of 1000 feet per minute. The filaments were drawn over a pin at 90° C. and a hot plate at 170° C. using a draw ratio of 5.0:1, to give lustrous, colourless fibre of tenacity 3.7 gm. per denier and extensibility 6.7%. The nitrogen content of the fibre was found to be 0.34% by micro-Kjeldahl analysis. This implied that 7% tribenzylamine by weight was present in the fibre. The fibre was dyed to a medium shade with Nylomine Red (Colour Index Acid Red 266) using exactly the same conditions as in Example 1.

In order to ascertain the resistance to scouring, a sample was scoured in a solution of Lissapol C (0.1% by weight) and sodium carbonate (0.2% by weight) in water at the boil for twenty minutes. Another sample was scoured in a solution of Lissapol C (0.1% by weight) and acetic acid (1.0% by weight) in water at the boil for one hour. Both samples were washed and dried and subjected to micro-Kjeldahl nitrogen analysis. In each case the nitrogen content after scouring was the same as it had been before scouring.

Example 5

A copolyethylene terephthalate was prepared according to the method described in Example 1 with the exception that sufficient polyethylene glycol of molecular weight 1540 was added to the initial reactants so that in the final copolyester 2 percent of the glycol links were polyethylene glycol links. The resultant copolyester was solidified and powdered. This is product 5a. The resultant powdered copolyester (95 parts by weight) was tumbled with tribenzylamine (5 parts by weight) in powder form. This is mixture 5b. This mixture was melt-spun at 253° C. through a 3-hole spinneret at a throughput rate of 1.3 g. per minute using a wind-up speed of 1000 feet per minute. The spun fibre was drawn over a pin at 55° C. and a plate at 85° C. using a draw ratio of 3.5:1.

The resultant drawn yarn 0.5 g. was subjected to dyeing at 100° C. for 1 hour in an aqueous dyebath composed of water (100 ml.) acetic acid (1.0 g.) and the dyestuff Colour Index Acid Red 266 (0.1 g.). The fibres were dyed to a deep red shade.

The copolyethylene terephthalate without added tribenzylamine was spun and drawn under the conditions described in this example and tthe resultant drawn yarn subjected to dyeing under the conditions described in this example. Only slight staining of the yarn was observed.

Example 6

The mixture 5b of Example 5 was melt-spun at 275° C. through a 3-hole spinneret at a throughput of 3 g. per minute and using a wind-up speed of 2,000 feet per minute. The resultant fibre was drawn over a pin at 60° C. and a plate at 140° C. using a draw ratio of 5.5:1. The resultant yarn had a tenacity of 5.24 g. per denier (4.72 g. per decitex) and extensibility of 17.8 percent. The yarn was subjected to dyeing at 100° C. for 1 hour under the conditions given in Table 1:

TABLE 1

| | |
|---|---|
| Dye concentration (percent by weight of fibre) | 3 |
| 30 percent aqueous acetic acid (percent by weight of fibre) | 3 |
| 85 percent aqueous formic acid (percent by weight of fibre) | 4 |
| Liquor to goods ratio | 60.1 |

Dyeings were carried out under the conditions described using each of the dyestuffs as follows:

Colour Index acid red 266,
Colour Index acid red 88,
Colour Index acid green 25,
Colour Index acid orange 7.

In each case the yarn was dyed to a deep shade. In the case of the dyeing with Colour Index acid red 266, the light fastness of the dyed yarn was tested. The dyed yarn was rated 2 on the International Blue Scale.

The copolyethylene terephthalate without added tribenzylamine was spun and drawn under the conditions described in this example and the resultant drawn yarn subjected to dyeing under the conditions described in this example. Only slight staining of the yarn was observed.

Example 7

The product 5a of Example 6 (95 parts by weight) was well mixed by tumbling with tribenzylamine (5 parts by weight) and 2-(2-hydroxyl-5-methylphenyl) benztriazole (2.75 parts by weight). The mixture was melt-spun at 264° C. through a 3-hole spinneret at a throughput of 3 g. per minute and using a wind-up speed of 2,000 feet per minute. The resultant fibre was drawn using a draw ratio of 5.5:1 over a pin at 65° C. and a plate at 135° C. The resultant yarn had a tenacity of 5.8 g. per denier (5.2 g. per decitex). This yarn dyed to deep shades using the same dyestuffs under the same conditions as described in Example 6. In the case of the sample dyed with the dyestuff of Colour Index acid red 266, the light fastness of the dyed yarn was tested. The dyed yarn was rated 4–5 on the International Blue Scale.

Example 8 p,p′-Dicarbomethoxy-1:2-diphenoxyethane (1300 parts by weight), ethylene glycol (490 parts by weight) and polyethylene glycol of molecular weight 1540 (177 parts by weight) were reacted together under ester-interchange conditions in the presence of manganese acetate (0.69) part by weight) as catalyst. When the theoretically obtainable amount of methanol had distilled off, the molten product was transferred to a glass polymerisation tube, antimony trioxide (0.52 part by weight) was added as polycondensation catalyst and triphenyl phosphate (1.96 parts by weight) and bis (2-hydroxy-3-α-methylcyclohexyl-5-methylphenyl) methane (6.5 parts by weight) were added as stabilizers. The mixture was heated at 285° C. under a stream of nitrogen until no further glycol distilled and final traces of glycol were removed by heating under a pressure of 0.2 mm. of mercury. After a total reaction time of 4½ hours, the polymerisation was complete and the polymer was extruded while molten and finely ground to a fine powder so as to pass a screen mesh of 0.5 mm. The resultant polymer had a Viscosity Ratio in orthochlorophenol at 25° C. of 2.10.

The polymer powder (95 parts by weight) and tribenzylamine (5 parts by weight) in finely powdered form were stirred together in a dish with acetone (200 parts by weight) and the acetone evaporated at 60° C. The polyester granules were thus coated intimately with the tribenzylamine. The product was dried at 110° C. in a vacuum oven and then melt-spun through a five-hole spinneret at 255° C. using a throughput of 2.0 g. per minute and a wind-up speed of 1000 feet per minute. The spun fibre was drawn over a hot pin at 50° C. and a hot plate at 145° C. using a draw ratio of 4.0:1. The resultant yarn was strong, lustrous and of excellent white colour.

Hanks of drawn yarn of 2.0 g. were dyed at 100° C. for 1 hour with mechanical agitation in an aqueous dyebath of the composition given in Table 1 of Example 6. Deep wash-fast shades were obtained using the dyestuffs of Colour Indexes acid red 266 and acid blue 138. The dyed shades were fast to tetrachloroethylene and to dry cleaning solvent at 40° C.

Samples of the yarn dyed with each of the two dyestuffs were exposed to a xenon arc for a total of 120 hours. Comparison with standard samples indicated a light fastness of 4–5 on the International Blue Scale.

The polyester without added tribenzylamine was spun and drawn under the conditions described in this example and the resultant drawn yarn subjected to dyeing under the conditions described in this example. Only slight staining of the yarn was observed.

What we claim is:
1. A process for the preparation of polyester or copolyester fibres which comprises forming an intimate mixture in the molten state of a member of the group consisting of polyesters of ethylene terephthalate, ethylene-1:2-diphenoxyethane-4:4'-dicarboxylate and copolyesters thereof with isophthalic acid, sebacic acid or polyethylene glycol and an amine of the formula:

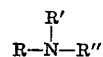

wherein each of the groups —R, —R' and —R" is one of the following groups: benzyl, cyclohexyl and n-octyl, said amine being present in an amount such that said mixture contains up to 0.8% nitrogen by weight of said mixture, and melt-spinning the mixture to form fibres.

2. A process according to claim 1 wherein the polyester is poly(ethylene terephthalate).

3. A process according to claim 1 wherein the copolyester is a copolyester of terephthalic acid, ethylene glycol and polyethylene glycol.

4. A process according to claim 1 wherein the polyester is poly(ethylene 1:2-diphenoxyethane-4-4'-dicarboxylate).

5. A process according to claim 1 wherein the copolyester is a copolyester of 1:2-diphenoxyethane-4:4'-dicarboxylic acid, ethylene glycol and polyethylene glycol.

6. A process according to claim 1 wherein the amine is tribenzylamine, tri(n-octyl) amine or N,N-dicyclohexylbenzylamine.

7. Fibres of improved substantivity towards acid dyestuffs as produced according to claim 1.

References Cited

UNITED STATES PATENTS 3,288,759  11/1966  Holub et al.
3,013,914  12/1961  Willard et al. _____ 260—75

WILLIAM H. SHORT, *Primary Examiner.*

M. GOLDSTEIN, *Assistant Examiner.*

U.S. Cl. X.R.

260—75; 8—55